No. 611,219. Patented Sept. 20, 1898.
E. S. T. KENNEDY & J. H. WILLIAMSON.
STEAM BOILER SETTING.
(Application filed Feb. 8, 1897.)

(No Model.) 7 Sheets—Sheet 1.

WITNESSES:
Harry S. Rohrer.
F. O. McCleary.

INVENTORS
Edw. S. T. Kennedy,
John H. Williamson,
BY
Kenner & Goldsborough,
ATTORNEYS No. 611,219. Patented Sept. 20, 1898.
E. S. T. KENNEDY & J. H. WILLIAMSON.
STEAM BOILER SETTING.
(Application filed Feb. 8, 1897.)
(No Model.) 7 Sheets—Sheet 2.

WITNESSES:
Harry S. Rohrer.
J. C. McCleary.

INVENTORS:
Edw. S. T. Kennedy,
John H. Williamson,
BY
Kenner & Goldsborough,
ATTORNEYS.

No. 611,219. Patented Sept. 20, 1898.
E. S. T. KENNEDY & J. H. WILLIAMSON.
STEAM BOILER SETTING.
(Application filed Feb. 8, 1897.)

(No Model.) 7 Sheets—Sheet 3.

WITNESSES: INVENTORS
Edw. S. T. Kennedy,
John H. Williamson,
BY
their Attorneys

No. 611,219. Patented Sept. 20, 1898.
E. S. T. KENNEDY & J. H. WILLIAMSON.
STEAM BOILER SETTING.
(Application filed Feb. 8, 1897.)

(No Model.) 7 Sheets—Sheet 4.

Witnesses
Inventors

No. 611,219. Patented Sept. 20, 1898.
E. S. T. KENNEDY & J. H. WILLIAMSON.
STEAM BOILER SETTING.
(Application filed Feb. 8, 1897.)

(No Model.) 7 Sheets—Sheet 5.

WITNESSES:
Harry S. Rohrer
F. O. McCleary

INVENTORS:
Edw. S. T. Kennedy,
John H. Williamson,
BY
Kennie & Goldsborough,
ATTORNEYS

UNITED STATES PATENT OFFICE.

EDWARD SELDEN TOWNSEND KENNEDY, OF LARCHMONT, NEW YORK, AND JOHN HERRON WILLIAMSON, OF BETHEL, CONNECTICUT, ASSIGNORS TO THE HAZELTON BOILER COMPANY, OF NEW YORK, N. Y.

STEAM-BOILER SETTING.

SPECIFICATION forming part of Letters Patent No. 611,219, dated September 20, 1898.

Application filed February 8, 1897. Serial No. 622,533. (No model.)

*To all whom it may concern:*

Be it known that we, EDWARD SELDEN TOWNSEND KENNEDY, residing at Larchmont, in the county of Westchester and State of New York, and JOHN HERRON WILLIAMSON, residing at the town of Bethel, in the county of Fairfield and State of Connecticut, citizens of the United States, have invented certain new and useful Improvements in Steam-Boiler Settings; and we do hereby declare the following to be a full, clear, and exact description of the invention, such as will enable others skilled in the art to which it appertains to make and use the same.

Our invention relates to certain new and useful improvements in steam-boiler settings, and has for its object to provide a compact, stable, economical, and durable construction, affording a considerable saving in the floor-space required, enabling the brickwork of the fuel-chamber to be readily renewed when out of repair or replaced by other brickwork adapted to a different fuel, providing for expansion without injury to the furnace-casing, protecting the casing against air-cracks and consequent accidental indrafts of air, rendering the superstructure independent of the expansion of the brickwork of the fuel-chamber, and particularly permitting a number of furnaces to be arranged as a battery side by side in close contact in such manner as to present a uniform and symmetrical appearance.

In the accompanying drawings.

Similar letters of reference indicate similar parts throughout the several views.

Upon referring to the drawings it will be observed that the settings are illustrated as applied to vertical boilers of the "water-tube" type, and particularly the well-known "porcupine" boiler, to which they are especially adapted, said boilers having the vertical main body portion A, supported upon its individual foundation and extending therefrom through the deflecting-furnace or fuel-chamber B up into the superstructure C, wherein the gaseous products of combustion ascend through the annular space partially occupied by the water-tubes. The fuel-chamber B is called a "deflecting-furnace," for the reason that at its upper portion it extends inwardly over the fireplace and under the lower radiating tubes of the boiler, so as to protect the outer ends of the lower tubes and to cause the products of combustion to start up centrally and in contact with the vertical cylinder. We wish it to be understood, however, that we do not limit ourselves to the employment of our improvements in connection with this particular boiler, but contemplate their use wherever they shall be found of utility in the art, regardless of the particular type or style of boiler which they inclose.

In boiler-settings of the general class wherein a lower fuel-chamber or deflecting-furnace is employed, together with an upper superstructure for the circulation of the products of combustion, it is sometimes desirable to rearrange the brickwork of the lower chamber in order to adapt the furnace to a different kind of fuel, and it is also necessary at times to remove and replace the brickwork in whole or in part when through long-continued use it has become out of repair. This renewal or replacement of the brickwork of the lower furnace is ordinarily a matter of considerable difficulty and danger because of the fact that the superstructure or upper combustion-chamber is supported upon the brickwork referred to, so that the employment of shoring-pieces and other temporary supports must be relied upon to insure the safety of the operation and to protect the workmen from danger.

One of the characteristic features of our invention consists in supporting the superstructure independently of the brickwork lining of the fuel-chamber, so that the brickwork may be removed or replaced in whole or in part without necessitating the employment of auxiliary supporting means for the superstructure and without imposing any accidental settling strain upon the superstructure and its own framework. A further advantage of this arrangement is that in the construction of the furnace the brickwork of the lower chamber can be so arranged as to leave room for the expansion incident to its employment without having such expansion transmitted to the superstructure. This leading feature of our invention is capable of embodiment in a variety of forms, various modifications of which are shown in the accompanying drawings.

In practice the superstructure may consist (as indicated, for instance, in Figs. 5 to 8, 11, 12, 19, and 21) of two concentric walls of brickwork having an intervening space and secured externally by encircling bands of steel $a$, or (as shown, for instance, in Figs. 1 to 4, 9, 10, 15, 23, 25, and 28) of an inner brick wall and an inclosing casing of steel plates separated from the inner brick wall by an intervening space that may be conveniently occupied by a non-conducting reverberatory filling, as shown. In either event the superstructure is supported by an annular shelf $b$, which shelf is in its turn supported independently of the brickwork lining of the lower furnace or fuel-chamber and out of contact with said brick lining, so that the upward expansion of the brick lining shall exercise no lifting strain upon the shelf.

The support for the shelf upon which the superstructure rests is preferably derived from a metallic casing of steel plates suitably riveted together and either mainly or entirely from vertical angle-bars, constituting the strengthening members of the casing. Thus in the construction shown in Figs. 23 and 24 the superstructure, consisting of the steel-plate casing D, the courses of brick $c$ and $c'$, together with the interposed lining of non-conducting reverberatory material $d$, rest upon the shelf $b$ and are supported mainly by the diagonal bracket member $e$, which is riveted at its upper end to the shelf and at its lower end to the vertical upright $f$, constituting one of the interior strengthening-ribs of the casing E of the fuel-chamber or deflecting-furnace. Auxiliary support is also derived from an annular rim $g$, angular in cross-section and riveted to the casing E and also to the shelf $b$ and a flange of the casing D.

Figures 24, 25:
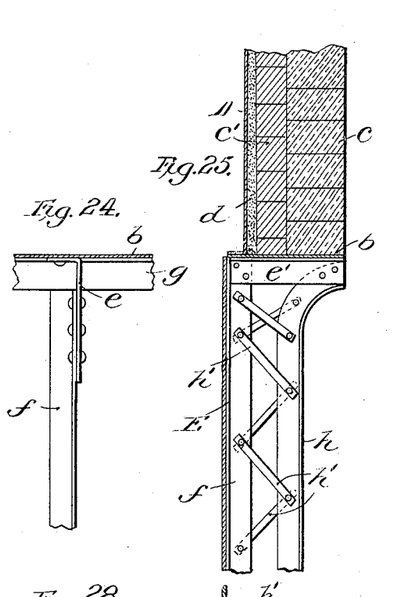
Figs. 25, 26, and 27 represent a side sectional elevation, cross-section, and vertical sectional elevation of a further modification thereof.
Figures 26, 28, 30:
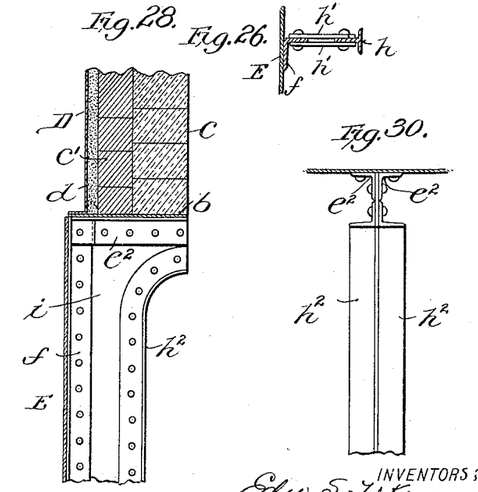
Figs. 28, 29, and 30 represent like views of a still further modification.
Figure 27:
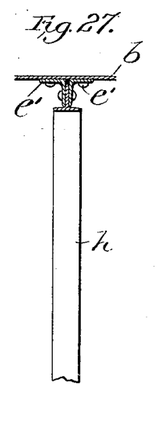

In the construction shown in Figs. 25, 26, and 27 the same superstructure is illustrated as supported upon a shelf $b$, to which are riveted two angle-irons $e'$, said angle-irons being in turn riveted to each other through the web of a T-iron $h$, bent at its upper end, and through the side flange of the strengthening-web $f$ of the lower casing E. In this instance to still further strengthen the structure and produce the necessary stability metallic cross-strips $h'$ are riveted across and between the members $h$ and $f$, as shown.

Figure 29:
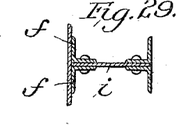

In the construction shown in Figs. 28, 29, and 30 the same superstructure resting upon the shelf $b$ is supported upon angle-bars $e^2$, riveted to the shelf $b$ and to each other through an intervening plate $i$, which plate forms a connecting member between the curved angle-bars $h^2$ and the uprights $f$ through the intermediacy of rivets, as shown.

In our preferred construction, hereinafter to be more particularly described, a superstructure of general circular contour is employed in connection with the fuel-chamber or deflecting-furnace having a rectangular firing-front or two rectangular firing-fronts. In such instances the rectangular corners of the lower casing are separated by a corresponding interval from the wall of the superstructure. In order to support the superstructure from said corners, we may, as shown in Figs. 15 to 18, employ a vertical angle-iron $f^2$ at the corner, in conjunction with a horizontal bar $k$, riveted to the vertical angle-bar and to a diagonal angle-bar $l$, which diagonal bar is riveted at one end to the vertical angle-iron $f^2$ and at the other end to the shelf $b$. In this instance, also, we prefer to provide an annular angle bar or ring $m$, riveted to the shelf, and which is itself in part supported by a horizontal angle-bar $n$, attached to the casing E, and in part by a cross-piece $n'$, riveted to the ring $m$ and to the horizontal angle-bar $n$.

Figure 19:
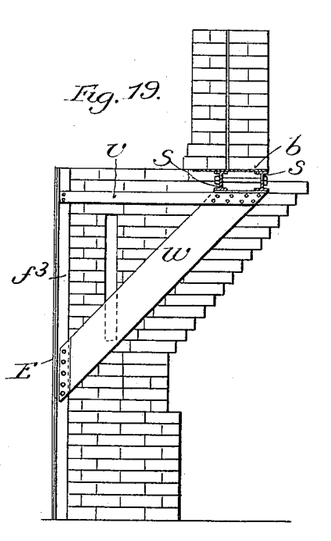
Figs. 19 and 20 represent, respectively, a sectional elevation and plan view of a modification of the superstructure-supporting devices.
Figure 20:
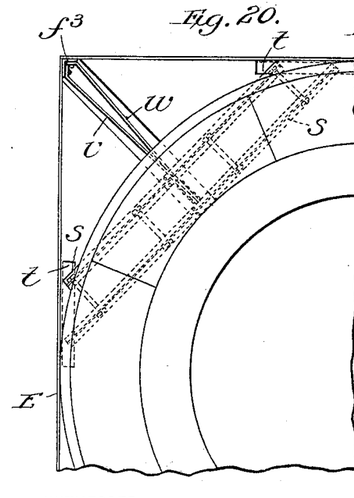

In the construction shown in Figs. 19 and 20 the two brickwork walls of the superstructure are supported upon a shelf $b$, which shelf rests upon a stringer formed of two I-beams $s$, bolted together and supported at their ends upon projecting pieces $t$, secured to the casing. The support for the compound stringer described is obtained from a diagonal bar $u$, riveted to the vertical angle-bar $f^3$ and to the bases of the I-beams of the stringer, and by a horizontal bar $v$, riveted at one end to the vertical angle-bar $f^3$ and at the other end to the diagonal bar $u$.

Figures 18, 22:
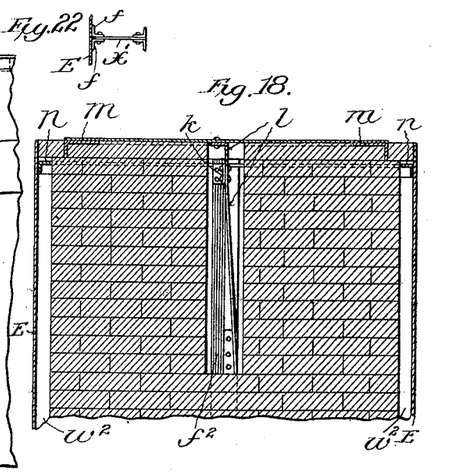
Fig. 18 represents an enlarged section on the line 18 18 of Fig. 16.
Figs. 21 and 22 represent, respectively, an elevation and cross-section of a further modification thereof.
Figure 21:
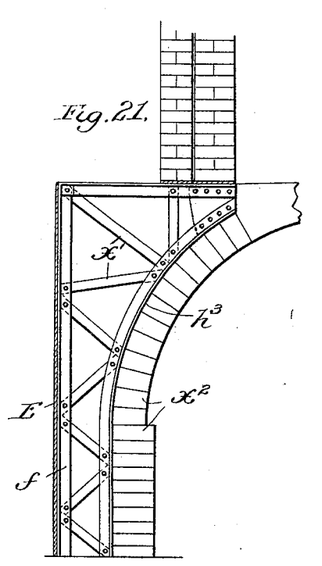
Figure 23:
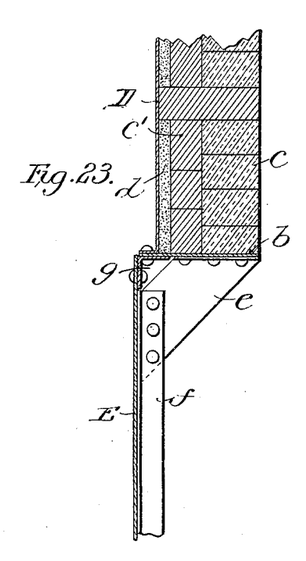
Figs. 23 and 24 represent sectional elevations of a further modification thereof.

The construction shown in Figs. 21 and 22 is substantially identical with that shown in Figs. 28 to 30, with the exception that instead of the continuous web $i$ shown in the latter figures a series of cross-pieces $x$ are employed. The curve of the inner angle-bars $h^3$ is, however, made more gradual, so as to carry the top arch of the brickwork of the deflecting-furnace farther inward, this fuel-chamber being especially appropriate to the burning of bagasse, as is indicated by the tiles $x'$ in said figures.

Figure 13:
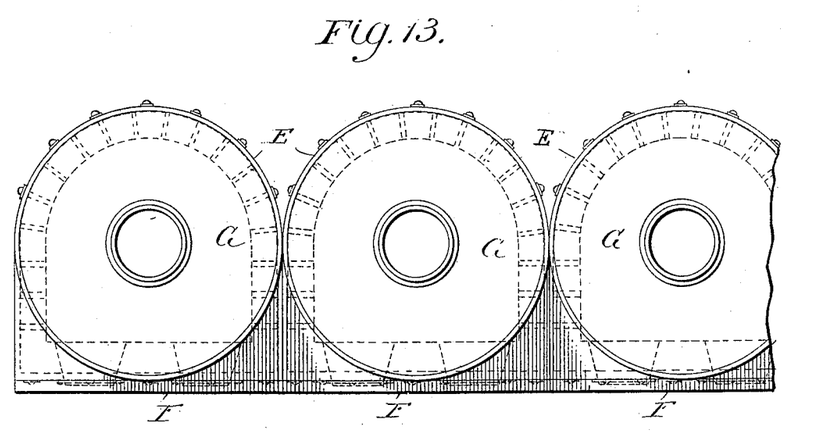
Fig. 13 represents a plan view of a series of settings of the types shown in Figs. 3 and 7, arranged close together to form a battery.
Figure 14:
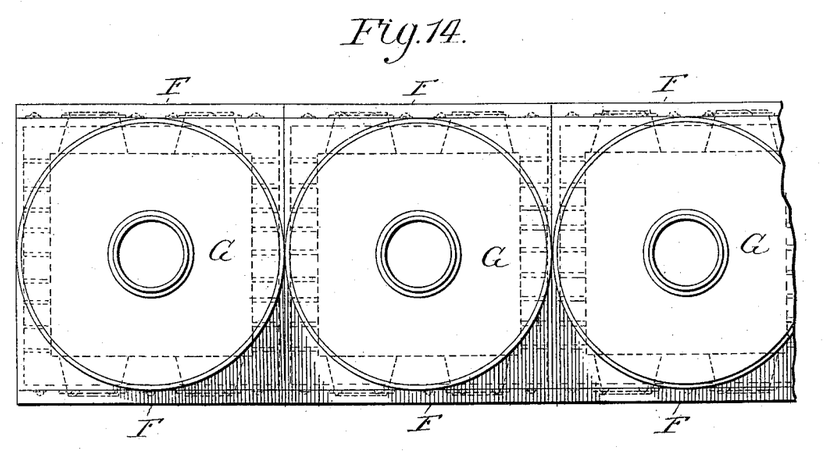
Fig. 14 represents a plan view of a battery of settings of the types shown in Figs. 1 and 5.
Figure 15:
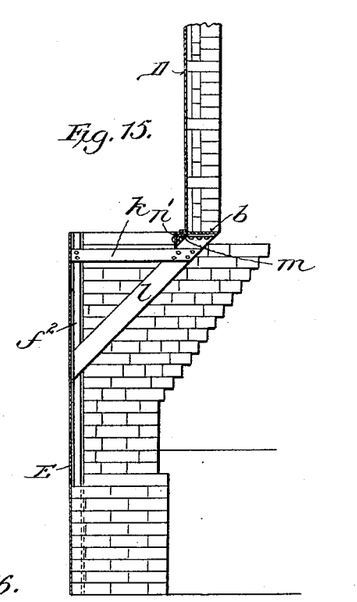
Fig. 15 represents, partly in section and partly in elevation, one of the arrangements employed for supporting the superstructure.
Figure 16:
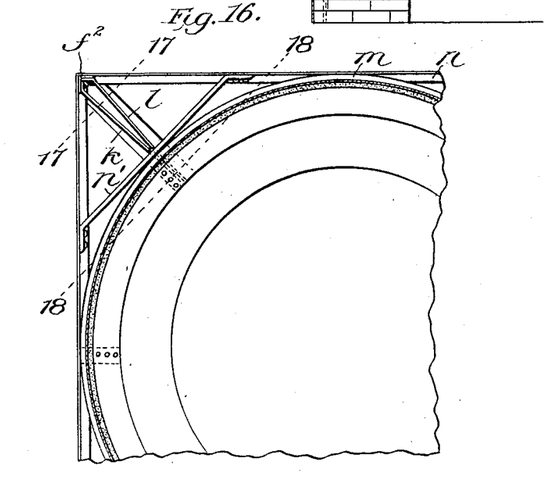
Fig. 16 represents a plan view thereof, partly in section.
Figure 17:
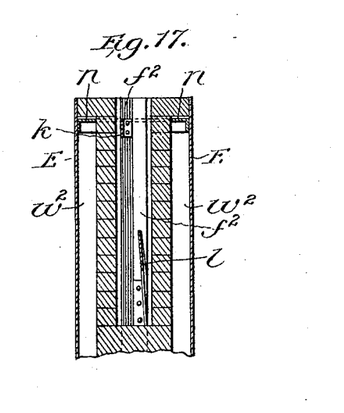
Fig. 17 represents an enlarged section on the line 17 17 of Fig. 16.

As we have already intimated, our preferred construction embodies the feature of providing a setting having in connection with the superstructure of general circular contour a fuel-chamber or deflecting-furnace directly below it and having a square or rectangular firing front or fronts. Among the prominent advantages of such a combination are that the settings can be built closely together in battery form, as indicated in Figs. 13 and 14, to present a composite structure of great symmetry and uniformity, that the grate surface can be increased in conformity to the larger dimensions of the fuel-chamber, and that when two firing-fronts are provided the firing can be done to greater advantage and with more ready facility. It is a further advantage of the general structure that the employment of metallic casings for both the superstructure and the deflecting-furnace permits a correspondingly-decreased thickness of the furnace-walls, and thereby not only facilitates the operation of stoking the furnace and cleaning the tubes, but also enables us to obtain a greater amount of grate-surface for the space occupied by the furnaces.

It will of course be understood that the furnace-fronts F may be of cast-iron, wrought-iron, or steel riveted to the casing and that they carry the usual stoking-doors, ash-pit doors, and other trimmings. The top of the furnace may be provided with the usual hood or bonnet G, as indicated.

Figure 1:
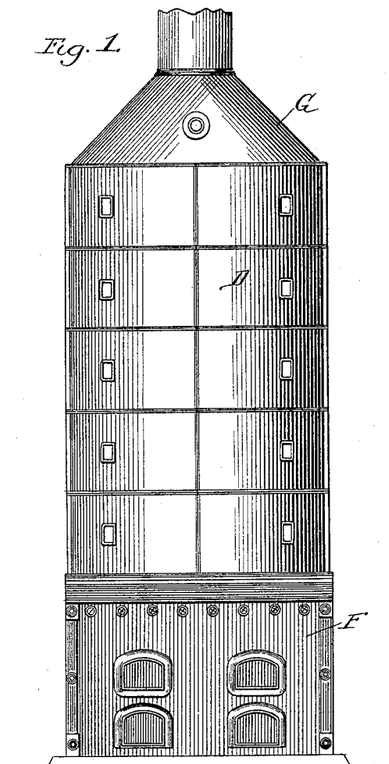
Figure 1 represents a front elevation of a steam-boiler setting embodying our invention.
Figure 2:
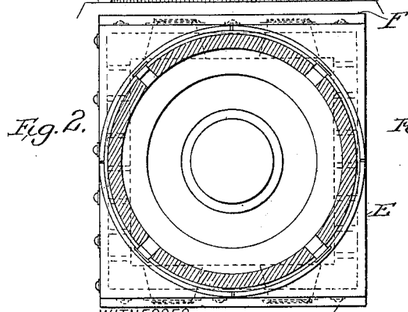
Fig. 2 represents a sectional plan view thereof.
Figure 3:
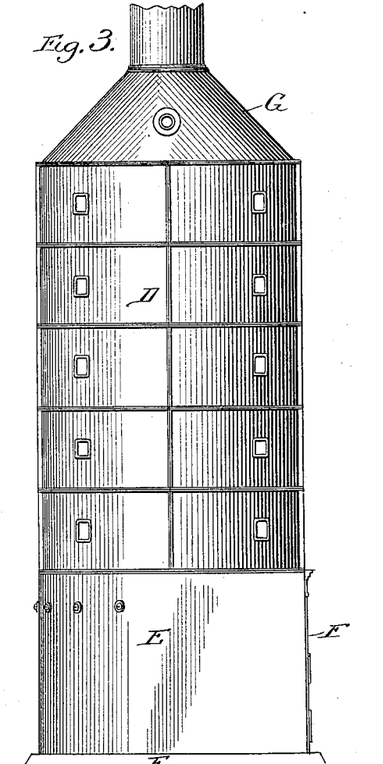
Figs. 3 and 4 represent, respectively, a side elevation and sectional plan view of a modification.
Figure 4:
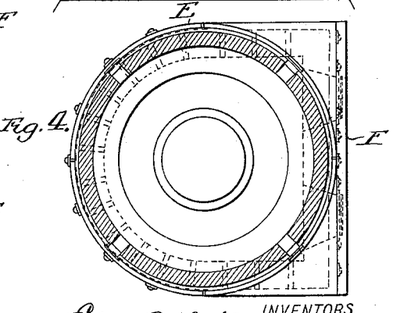
Figure 5:
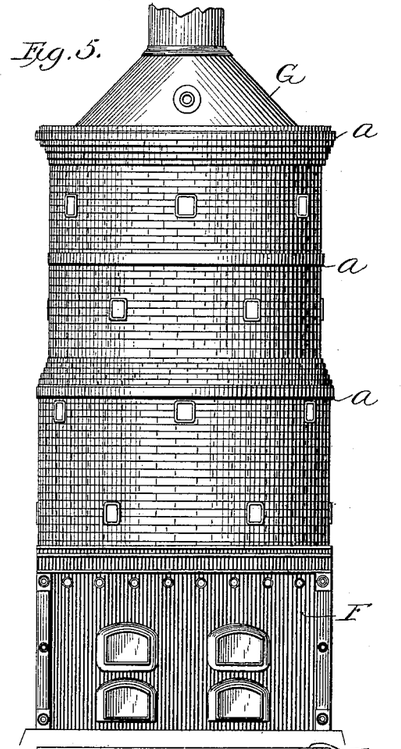
Figs. 5 and 6 represent, respectively, a side elevation and sectional plan view of a further modification.
Figure 6:
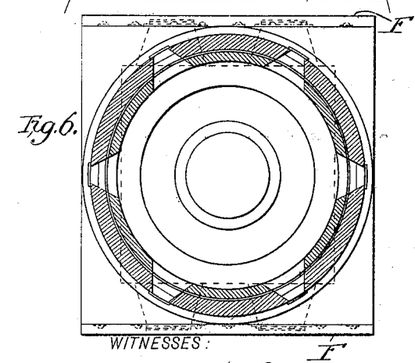
Figure 7:
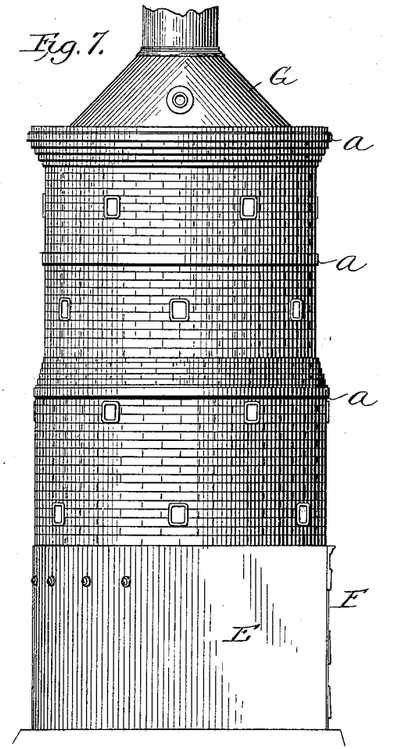
Figs. 7 and 8 represent, respectively, a side elevation and sectional plan view of a further modification.
Figure 8:
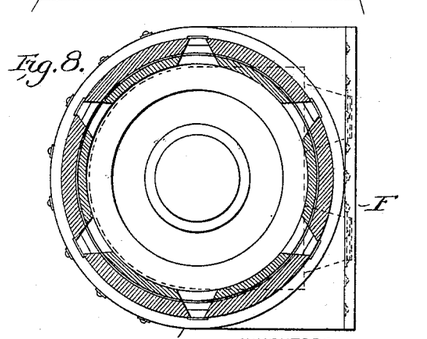
Figure 9:
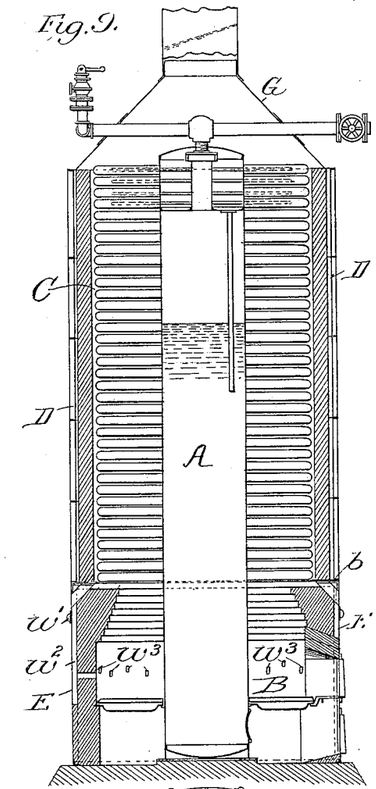
Figs. 9 and 10 represent, respectively, a central vertical section and a sectional plan view of a further modification.
Figure 10:
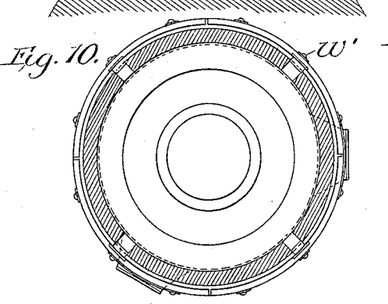
Figure 11:
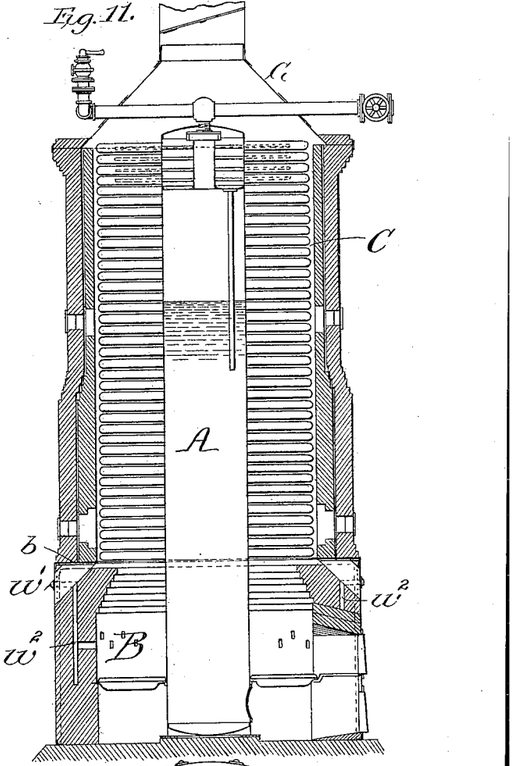
Figs. 11 and 12 represent, respectively, a central vertical section and a sectional plan view of a still further modification.
Figure 12:
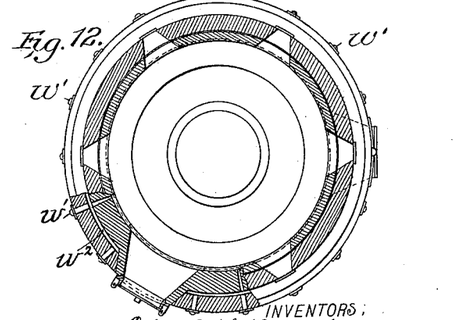

Between the casing and the brickwork lining of the fuel-chamber we provide an annular space $w^2$, (see, for instance, Figs. 9, 11, 18, and 19,) which space provides room for any expansion of the brickwork from the fire outwardly and thereby protects the casing from injury. We also provide this space $w$ with a series of inlet-openings, one or all of which may be closed by plugs $w'$, as desired, so as to regulate the admission of air from without. The purpose of the air thus admitted is to cool the brickwork and also to supply heated air to the fuel-chamber, into which it escapes through inlet-ports $w^3$, as indicated in Fig. 9.

On reference to Figs. 15 to 18 it will be noted that the brackets supporting the superstructure are located in enlarged recesses formed in the brickwork, a construction having for its object to leave sufficient space for the expansion of the brickwork without having it exercise any strain upon the bracket members. In fact, it will be understood that wherever the brackets are located they will be contained within enlarged recesses of the brickwork for the purpose described.

Having thus described our invention, what we claim is—

1. A steam-boiler setting, provided with a lower or fuel chamber having an inclosing casing, and having a self-sustaining lining of brickwork supported independently of the casing, and an upper chamber for the circulation of the products of combustion, said upper chamber being supported independently of the brickwork of the lower chamber and having its walls over the brick lining of the lower chamber but separated therefrom by an intervening expansion-space.

2. A steam-boiler setting, provided with a lower or fuel chamber having an inclosing casing, and having a self-sustaining lining of brickwork supported independently of the casing, and an upper chamber for the circulation of the products of combustion, said upper chamber having inner walls and an outer envelop or casing inclosing but not supporting said inner walls, said inner walls being supported from the casing of the lower chamber independently of the brickwork lining of said lower chamber, and separated therefrom by an intervening expansion-space.

3. A steam-boiler setting, provided with a brick-lined lower or fuel chamber, an upper chamber for the circulation of the products of combustion, said lower chamber being provided with an inclosing casing, and brackets extending from the said casing and supporting the upper chamber.

4. A steam-boiler setting, provided with a brick-lined lower or fuel chamber, an upper chamber for the circulation of the products of combustion, said lower chamber being provided with an inclosing casing, a shelf upon which the upper chamber rests, and brackets extending from said casing and supporting the shelf and upper chamber.

5. A steam-boiler setting, provided with a brick-lined lower or fuel chamber, an upper chamber for the circulation of the products of combustion, said lower chamber being provided with an inclosing casing, a shelf upon which the upper chamber rests, and brackets extending from said casing and supporting the shelf and upper chamber, said brackets comprising diagonal and horizontal members and uprights.

6. A steam-boiler setting, provided with a brick-lined lower or fuel chamber, an upper chamber for the circulation of the products of combustion, said lower chamber being provided with an inclosing casing, a shelf upon which the upper chamber rests, and brackets extending from said casing and supporting the shelf and upper chamber, said brackets comprising diagonal and horizontal members and uprights, the diagonal members extending from angles of the casing.

7. A steam-boiler setting, provided with a brick-lined lower or fuel chamber, an upper chamber for the circulation of the products of combustion, said lower chamber being provided with an inclosing casing, and brackets extending from the said casing and supporting the upper chamber, said brackets being located in enlarged recesses of the brickwork, so as to be independent of expansion of the latter.

8. A steam-boiler setting, provided with a brick-lined lower or fuel chamber, an upper chamber for the circulation of the products of combustion, a shelf upon which the upper chamber rests and brackets for supporting the shelf independently of the brickwork of the lower chamber, said brackets comprising diagonal and horizontal members and uprights and being located in enlarged recesses of the brickwork, so as to be independent of expansion of the latter.

9. A steam-boiler setting, provided with a brick-lined lower or fuel chamber provided with an inclosing casing, an upper chamber for the circulation of the products of combustion, a shelf upon which the upper chamber rests and brackets for supporting the shelf independently of the brickwork of the lower chamber, said brackets comprising diagonal and horizontal members and uprights joined to the inclosing casing of the lower chamber and being located in enlarged recesses of the brickwork, so as to be independent of expansion of the latter.

10. A steam-boiler setting, provided with a brick-lined lower or fuel chamber, said lower chamber being provided with an inclosing casing angular in cross-section, and an upper chamber for the circulation of the products of combustion, said upper chamber being of general circular contour, a shelf upon which the upper chamber rests and diagonal shelf-supporting bracket-pieces extending from the angles of the casing of the lower chamber.

11. A steam-boiler setting, provided with a brick-lined lower or fuel chamber, said lower chamber being provided with an inclosing casing angular in cross-section, and an upper chamber for the circulation of the products of combustion, said upper chamber being of general circular contour, a shelf upon which the upper chamber rests and shelf-supporting bracket-pieces extending from the angles of the casing of the lower chamber, one of said bracket-pieces being horizontal and one being diagonal, the said bracket-pieces being located in enlarged recesses of the brickwork, so as to be independent of expansion of the latter.

12. A steam-boiler setting, provided with a brick-lined lower or fuel chamber, said lower chamber being provided with an inclosing casing angular in cross-section and an upper chamber for the circulation of the products of combustion, said chamber being of general circular contour, a shelf upon which the upper chamber rests, diagonal shelf-supporting bracket-pieces extending from the angles of the casing of the lower chamber, and an auxiliary shelf-supporting stringer or girder member, spanning the angles of the casing, said shelves-supporting bracket-pieces and auxiliary stringer being located in enlarged recesses of the brickwork so as to be independent of expansion of the latter.

13. A steam-boiler setting, having a superstructure of substantially cylindrical contour, for the circulation of the products of combustion, and a subjacent deflecting-furnace having a substantially rectangular grate-surface and having an inclosing casing and an independently-supported brick lining, the superstructure being supported from the said inclosing casing independently of the said brick lining, and the deflecting-furnace having a rectangular front.

14. A steam-boiler setting, having a superstructure of substantially cylindrical contour, for the circulation of the products of combustion, and a subjacent deflecting-furnace having a substantially rectangular grate-surface and having an inclosing casing and an independently-supported brick lining, the superstructure being supported from the said inclosing casing independently of the said brick lining, and the deflecting-furnace having a rectangular front, and front and rear firing-doors.

In testimony whereof we affix our signatures in presence of two witnesses.

EDWARD SELDEN TOWNSEND KENNEDY.
JOHN HERRON WILLIAMSON.

Witnesses:
HENRY SUMNER SWAIN,
HERMAN KRAUSE.